(12) United States Patent
Lindoff et al.

(10) Patent No.: US 11,510,160 B2
(45) Date of Patent: Nov. 22, 2022

(54) NETWORK ACCESS NODE AND CLIENT DEVICE FOR MAINTAINING TIME-SYNCHRONIZATION

(71) Applicant: HUAWEI TECHNOLOGIES CO., LTD., Guangdong (CN)

(72) Inventors: Bengt Lindoff, Kista (SE); Gustaf Claeson, Lund (SE); Rama Kumar Mopidevi, Lund (SE); Wenquan Hu, Lund (SE); Thorsten Schier, Lund (SE)

(73) Assignee: Huawei Technologies Co., Ltd., Guangdong (CN)

( * ) Notice: Subject to any disclaimer, the term of this patent is extended or adjusted under 35 U.S.C. 154(b) by 252 days.

(21) Appl. No.: 17/069,261

(22) Filed: Oct. 13, 2020

(65) Prior Publication Data
US 2021/0029655 A1 Jan. 28, 2021

Related U.S. Application Data

(63) Continuation of application No. PCT/EP2018/061655, filed on May 7, 2018.

(51) Int. Cl.
*H04W 56/00* (2009.01)
*H04L 25/02* (2006.01)
(Continued)

(52) U.S. Cl.
CPC ....... *H04W 56/001* (2013.01); *H04L 25/0226* (2013.01); *H04W 56/0045* (2013.01);
(Continued)

(58) Field of Classification Search
CPC ........... H04W 56/001; H04W 56/0045; H04W 72/042; H04W 74/0833; H04W 80/02; H04L 25/0226
See application file for complete search history.

(56) References Cited

U.S. PATENT DOCUMENTS

| | | | |
|---|---|---|---|
| 2010/0111028 A1 | 5/2010 | Kim et al. | |
| 2013/0242953 A1* | 9/2013 | Malkamaki | H04W 56/0045 370/336 |
| 2013/0258958 A1* | 10/2013 | Dinan | H04W 56/0045 370/329 |

FOREIGN PATENT DOCUMENTS

| | | |
|---|---|---|
| CN | 101296024 A | 10/2008 |
| CN | 101888648 A | 11/2010 |

(Continued)

OTHER PUBLICATIONS

IEEE Std 802.11-2016 (Revision of IEEE Std 802.11-2012), "Part 11: Wireless LAN Medium Access Control (MAC) and Physical Layer (PHY) Specifications," IEEE Computer Society, Sponsored by the LAN/MAN Standards Committee, Dec. 2016, 3534 pages.
3GPP TS 38.321 V15.1.0 (Mar. 2018), "3rd Generation Partnership Project;Technical Specification Group Radio Access Network;NR;Medium Access Control (MAC) protocol specification (Release 15)," Mar. 2018, 67 pages.
(Continued)

*Primary Examiner* — Kyaw Z Soe
(74) *Attorney, Agent, or Firm* — Fish & Richardson P.C.

(57) ABSTRACT

The application relates to maintaining time-synchronization of a wireless connection between a network access node and a client device. The wireless connection may be configured for services with latency constraints. In one example, based on an expiry of a time alignment timer for the client device, the network access node transmits a control message to the client device. The control message instructs the client device to transmit a response signal to the network access node. The response signal can be used by the network access node to determine the timing advance for the wireless connection and adjust the timing advance.

20 Claims, 4 Drawing Sheets

(51) Int. Cl.
*H04W 72/04* (2009.01)
*H04W 74/08* (2009.01)
*H04W 80/02* (2009.01)

(52) U.S. Cl.
CPC ..... *H04W 72/042* (2013.01); *H04W 74/0833* (2013.01); *H04W 80/02* (2013.01)

(56) References Cited

FOREIGN PATENT DOCUMENTS

| CN | 102083197 A | 6/2011 |
|----|-------------|--------|
| CN | 104969654 A | 10/2015 |
| EP | 2709292 A2 | 3/2014 |

OTHER PUBLICATIONS

3GPP TS 38.211 V15.1.0 (Mar. 2018), "3rd Generation Partnership Project;Technical Specification Group Radio Access Network;NR;Physical channels and modulation(Release 15)," Mar. 2018, 90 pages.

3GPP Ts 38.300 V15.1.0 (Mar. 2018), "3rd Generation Partnership Project; Technical Specification Group Radio Access Network; NR; NR and NG-RAN Overall Description; Stage 2 (Release 15)," Mar. 2018, 71 pages.

PCT International Search Report and Written Opinion issued in International Application No. PCT/EP2018/061655 dated Jun. 17, 2019, 20 pages.

Office Action in Chinese Application No. 201880091512.X, dated Mar. 2, 2021, 22 pages.

\* cited by examiner

NETWORK ACCESS NODE AND CLIENT DEVICE FOR MAINTAINING TIME-SYNCHRONIZATION

CROSS-REFERENCE TO RELATED APPLICATIONS

This application is a continuation of International Application No. PCT/EP2018/061655, filed on May 7, 2018, the disclosure of which is hereby incorporated by reference in its entirety.

TECHNICAL FIELD

The application relates to a network access node and a client device for maintaining time-synchronization of a wireless connection. Furthermore, the application also relates to corresponding methods and a computer program.

BACKGROUND

The growth of wireless data traffic over the past three decades has been relentless. The upcoming fifth-generation (5G) wireless cellular communication system, new radio (NR), is expected to carry 1000 times more traffic while maintaining high reliability. Another critical requirement of 5G is support for ultra-low latency services, where latency corresponds to the time required for transmitting a data packet through the network.

The current fourth-generation (4G) wireless cellular communication system, LTE, have a nominal latency of about 50 ms. However, this is currently unpredictable and can go up to several seconds. Moreover, it is mainly optimized for mobile broadband traffic with target block error rate (BLER) of 10e-1 before re-transmission.

There is a consensus that the future for many services, e.g. industrial control, traffic safety, medical, and internet services, depends on wireless connectivity with guaranteed consistent latencies of 0.5 ms or less, as well as exceedingly stringent reliability of residual BLER below 10e-5. The projected enormous capacity growth is achievable through conventional methods of moving to higher parts of the radio spectrum and network densifications. However, significant reductions in latency, while guaranteeing ultra reliability and low latency communication (URLLC) services, will put several challenges on the design of the 5G wireless communication system.

URLLC services will require the user equipment (UE) to be in-synchronization with the serving cell and in an active state, while the URLLC service is ongoing. Furthermore, a variety of URLLC services can be expected from so called chatty applications with frequent transmission of small data packets with tough latency and reliability requirements, to alarm systems where sensors may in-frequently report alarms, but once alarming, the latency need to be short and reliability need to be high. A wide range of QoS levels for different URLLC services are therefore expected.

SUMMARY

An objective of embodiments of the application is to provide a solution which mitigates or solves the drawbacks and problems of conventional solutions.

The above and further objectives are solved by the subject matter of the independent claims. Further advantageous embodiments of the application can be found in the dependent claims.

According to a first aspect of the application, the above mentioned and other objectives are achieved with a network access node for a wireless communication system, the network access node being configured to setup a wireless connection with a client device; transmit a control message to the client device when a time-synchronization event for the wireless connection is triggered, wherein the control message instructs the client device to transmit a response signal to the network access node upon reception of the control message for maintaining a time-synchronization of the wireless connection.

That a time-synchronization event for the wireless connection is triggered can herein be understood to mean that an event associated with the time-synchronization of the wireless connection has occurred, e.g. an event indicating that the time-synchronization of the wireless connection is considered to become unreliable.

To maintain a time-synchronization of the wireless connection can in this disclosure be understood to mean to keep the wireless connection uplink time-synchronized in terms of e.g. having correct timing advance and/or timing alignment.

An advantage of a network access node according to the first aspect is that the network access node can maintain the time-synchronization of the wireless connection, meaning QoS can be guaranteed for time critical and/or high reliability services.

In an implementation form of a network access node according to the first aspect, the time-synchronization event is triggered based on an expiry of a (network side) time alignment timer configured for the client device.

An advantage with this implementation form is that unreliability of the time-synchronization for the wireless connection can be detected based on an already defined timer, and hence the overall signalling overhead can be reduced.

In an implementation form of a network access node according to the first aspect, the time-synchronization event is triggered prior to the expiry of the time alignment timer with a time threshold value.

An advantage with this implementation form is that unreliability of the time-synchronization for the wireless connection can be detected based on the time threshold value, and hence the network access node can transmit the control message at a time prior to time alignment timer expiry which is flexibly determined by the time threshold value. Thereby, the flexibility of the resource allocation in the network access node can be improved.

In an implementation form of a network access node according to the first aspect, the network access node is further configured to transmit the control message to the client device after a time period after the time-synchronization event has been triggered, wherein the time period is determined based on at least one of a cell load and an available capacity of the network access node.

An advantage with this implementation form is that the network access node can transmit the control message when it is suitable from a capacity and cell load perspective, thereby improving the resource utilization in the system.

In an implementation form of a network access node according to the first aspect, the control message is any of downlink control information instructing transmission of a random access preamble, downlink control information instructing transmission of a sounding reference signal, downlink control information instructing transmission of a response signal for maintaining time-synchronization of the wireless connection, and medium access control control element instructing transmission of a response signal for maintaining time-synchronization of the wireless connection.

An advantage with this implementation form is that the control message is transmitted using control information structures defined in the standard. The client device can hence reuse the corresponding decoding structures already implemented to receive the control message, thereby simplifying the client device implementation.

In an implementation form of a network access node according to the first aspect, the control message instructs the client device to transmit the response signal as any of a signal associated with a physical uplink shared channel, a signal associated with a physical uplink control channel, a signal associated with a physical random access channel, and a sounding reference signal.

An advantage with this implementation form is that the response signal is transmitted using physical channel structures defined in the standard. The network access node can hence reuse the corresponding demodulation structures already implemented for respective physical channel to receive the response signal, thereby simplifying the network access node implementation.

In an implementation form of a network access node according to the first aspect, the control message indicates time-frequency resources associated with the response signal.

An advantage with this implementation form is that the network access node can freely allocated resources for the response signal, thereby improving uplink spectrum utilization.

In an implementation form of a network access node according to the first aspect, the network access node is further configured to receive the response signal from the client device; determine a timing advance based on the received response signal; determine a timing advance value based on the determined timing advance; transmit the timing advance value to the client device.

An advantage with this implementation form is that the network access node can determine correct uplink timing for the client device and thereby maintain continuous time-synchronization for the wireless connection.

In addition upon transmission of the timing advance value, the network access node may reset and restart the network side time alignment, TA, timer associated with the received timing advance value and the wireless connection.

In an implementation form of a network access node according to the first aspect, the wireless connection is configured for services with a latency constraint.

An advantage with this implementation form is that the signalling procedure according to the application is used for services requiring continuous time-synchronization. Thereby, overall overhead signalling in the cellular system can be minimized and cell capacity can be improved.

In an implementation form of a network access node according to the first aspect, the latency constraint is associated with at least one of a quality of service flow identity, a network slice selection assistance information configuration, a radio resource control parameter, and a medium access control parameter.

An advantage with this implementation form is that well defined parameters are used to identify services requiring continuous time-synchronization. Thereby, overall overhead signalling in the cellular system can be minimized and cell capacity can be improved.

According to a second aspect of the application, the above mentioned and other objectives are achieved with a client device for a wireless communication system, the client device being configured to setup a wireless connection with a network access node; receive a control message from the network access node, wherein the control message instructs the client device to transmit a response signal to the network access node for maintaining a time-synchronization of the wireless connection; transmit the response signal to the network access node upon reception of the control message.

An advantage of a client device according to the second aspect is that the client device by transmitting the response signal according to the control message maintains the time-synchronisation of the wireless connection. Thereby, QoS for ongoing services can be maintained continuously.

In an implementation form of a client device according to the second aspect, the control message is any of downlink control information instructing transmission of a random access preamble, downlink control information instructing transmission of a sounding reference signal, downlink control information instructing transmission of a response signal for maintaining time-synchronization of the wireless connection, and medium access control (MAC) control element instructing transmission of a response signal for maintaining time-synchronization of the wireless connection.

An advantage with this implementation form is that the control message is transmitted using control information structures defined in the standard. The client device can hence reuse the corresponding decoding structures already implemented to receive the control message, thereby simplifying the client device implementation.

In an implementation form of a client device according to the second aspect, the control message instructs the client device to transmit the response signal as any of a signal associated with a physical uplink shared channel, a signal associated with a physical uplink control channel, a signal associated with a physical random access channel, and a sounding reference signal.

An advantage with this implementation form is that the response signal is transmitted using physical channel structures defined in the standard. The network access node can hence reuse the corresponding demodulation structures already implemented for respective physical channel to receive the response signal, simplifying the network access node implementation.

In an implementation form of a client device according to the second aspect, the control message indicates time-frequency resources associated with the response signal, and the client device is further configured to transmit the response signal in the indicated time-frequency resources.

An advantage with this implementation form is that the client device knows which resources to use for the response signal and thereby the risk for creating uplink interference when transmitting the response signal is reduced.

In an implementation form of a client device according to the second aspect, the client device is further configured to receive a timing advance value from the network access node in response to the transmission of the response signal to the network access node; time adjust transmissions to the network access node based on the received timing advance value.

An advantage with this implementation form is that the client device adapts its uplink timing to a timing determined by the network access node and thereby the risk for creating uplink interference when transmitting the response signal is reduced.

In addition upon reception of the timing advance value, the client device may reset and restart a client side time alignment, TA, timer associated with the received timing advance value and the wireless connection. Thereby an unnecessary triggering of a Random Access Procedure is avoided.

In an implementation form of a client device according to the second aspect, the wireless connection is configured for services with a latency constraint.

An advantage with this implementation form is that the signalling procedure according to the application is used for services requiring continuous time-synchronization. Thereby, overall overhead signalling in the cellular system can be minimized and cell capacity can be improved.

In an implementation form of a client device according to the second aspect, the latency constraint is associated with at least one of a quality of service flow identity, a network slice selection assistance information configuration, a radio resource control parameter, and a medium access control parameter.

An advantage with this implementation form is that well defined parameters are used to identify services requiring continuous time-synchronization. Thereby, overall overhead signalling in the cellular system can be minimized and cell capacity can be improved.

According to a third aspect of the application, the above mentioned and other objectives are achieved with a method for a network access node, the method comprises setting up a wireless connection with a client device; transmitting a control message to the client device when a time-synchronization event for the wireless connection is triggered, wherein the control message instructs the client device to transmit a response signal to the network access node upon reception of the control message for maintaining a time-synchronization of the wireless connection.

The method according to the third aspect can be extended into implementation forms corresponding to the implementation forms of the network access node according to the first aspect. Hence, an implementation form of the method comprises the feature(s) of the corresponding implementation form of the network access node.

The advantages of the methods according to the third aspect are the same as those for the corresponding implementation forms of the network access node according to the first aspect.

According to a fourth aspect of the application, the above mentioned and other objectives are achieved with a method for a client device, the method comprises setting up a wireless connection with a network access node; receiving a control message from the network access node, wherein the control message instructs the client device to transmit a response signal to the network access node for maintaining a time-synchronization of the wireless connection; transmitting the response signal to the network access node upon reception of the control message.

The method according to the fourth aspect can be extended into implementation forms corresponding to the implementation forms of the client device according to the second aspect. Hence, an implementation form of the method comprises the feature(s) of the corresponding implementation form of the client device.

The advantages of the methods according to the fourth aspect are the same as those for the corresponding implementation forms of the client device according to the second aspect.

The application also relates to a computer program, characterized in program code, which when run by at least one processor causes said at least one processor to execute any method according to embodiments of the application. Further, the application also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the application will be apparent from the following detailed description.

BRIEF DESCRIPTION OF THE DRAWINGS

The appended drawings are intended to clarify and explain different embodiments of the application, in which.

DETAILED DESCRIPTION

In LTE and for e.g. NR mobile broadband services, timing advance control is used to initiate and maintain uplink time-synchronization for a UE. A network access node, e.g. in NR a so called next generation nodeB (gNB), estimates the initial timing advance from a random access request sent by the UE during initial access. The random access request is further used as timing reference for uplink during e.g. radio link failure and handover. Upon receiving a random access request, the gNB calculates the timing advance value and transmits the timing advance value to the UE in a timing advance command as part of a random access response. Once the UE is in connected mode, the gNB continuously estimates timing advance for the UE and transmits a timing advance command to the UE if a correction of the uplink timing is required. In LTE, the UE adjusts the timing of its uplink transmission at subframe #n+6 for a timing advance command received in downlink subframe #n. In NR, other numbers may be applicable.

The gNB further provides the UE with a configurable timer, a so called time alignment timer (TimeAlignmentTimer), for each timing advance group. A timing advance group comprises one or more serving cells with the same uplink timing advance. The TimeAlignmentTimer for a timing advance group controls how long the UE considers the serving cells belonging to the timing advance group to be uplink time aligned. The TimeAlignmentTimer is normally re-started whenever the UE receives a new timing advance command from the gNB. If the TimeAlignmentTimer for the timing advance group expires, the serving cells belonging to the timing advance group are no longer considered to be uplink time aligned. In this case, the UE does not perform any uplink transmission on the serving cells belonging to the timing advance group except a random access preamble transmission. The random access preamble is transmitted to restore uplink time-synchronization. However, in conventional systems even if the TimeAlignmentTimer expires, the random access preamble is transmitted first when the UE has data to transmit or receive. For service with strict latency and/or reliability constraints, such as e.g. ultra reliability and low latency communication (URLLC) services, the latency of the random access procedure becomes a problem.

This puts requirement on for instance uplink time-synchronization procedures defined in the NR standard for such services. Consequently, the inventors have identified a need to improve the uplink time-synchronization procedure, especially for certain service types, such as e.g. URLLC services. Therefore, according to embodiments of the application a network access node 100 is configured to maintain time-synchronization of a wireless connection 502 with a client device 300 by using a signalling procedure with the client device 300 which prevents the client device 300 from losing its uplink time-synchronization.

Figure 1:
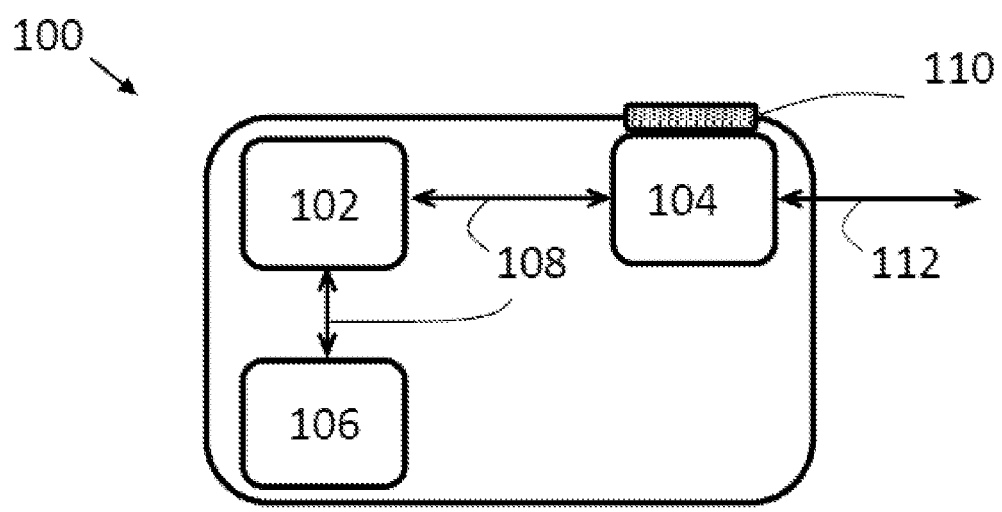
FIG. 1 shows a network access node according to an embodiment of the application.

FIG. 1 shows a network access node 100 according to an embodiment of the application. In the embodiment shown in FIG. 1, the network access node 100 comprises a processor 102, a transceiver 104 and a memory 106. The processor 102 is coupled to the transceiver 104 and the memory 106 by communication means 108 known in the art. The network access node 100 may be configured for both wireless and wired communications in wireless and wired communication systems, respectively. The wireless communication capability is provided with an antenna or antenna array 110 coupled to the transceiver 104, while the wired communication capability is provided with a wired communication interface 112 coupled to the transceiver 104.

That the network access node 100 is configured to perform certain actions can in this disclosure be understood to mean that the network access node 100 comprises suitable means, such as e.g. the processor 102 and the transceiver 104, configured to perform said actions.

Figure 5:
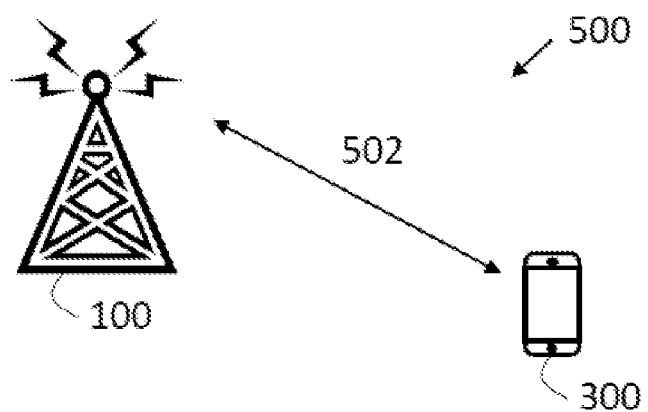
FIG. 5 shows a wireless communication system according to an embodiment of the application.
Figure 7:
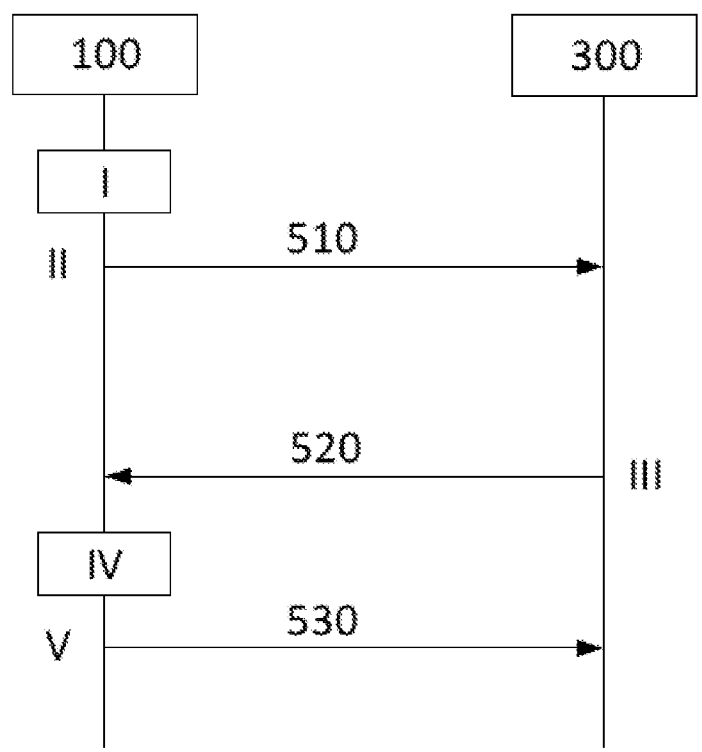
FIG. 7 shows signalling between a network access node and a client device according to an embodiment of the application.

According to embodiments of the application the network access node 100 is configured to setup a wireless connection 502 with a client device 300, as shown in FIG. 5. The network access node 100 is further configured to transmit a control message 510 to the client device 300 when a time-synchronization event for the wireless connection 502 is triggered, as shown in FIG. 7. The control message 510 instructs the client device 300 to transmit a response signal 520, as shown in FIG. 7 to the network access node 100 upon reception of the control message 510 for maintaining a time-synchronization of the wireless connection 502.

Figure 2:
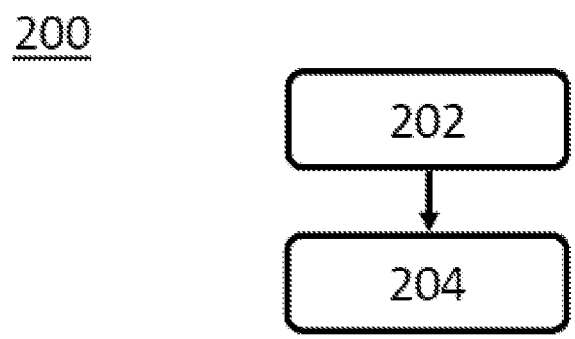
FIG. 2 shows a method according to an embodiment of the application.

FIG. 2 shows a flow chart of a corresponding method 200 which may be executed in a network access node 100, such as the one shown in FIG. 1. The method 200 comprises setting up 202 a wireless connection 502 with a client device 300. The method 200 further comprises transmitting 204 a control message 510 to the client device 300 when a time-synchronization event for the wireless connection 502 is triggered. The control message 510 instructs the client device 300 to transmit a response signal 520 to the network access node 100 upon reception of the control message 510 for maintaining a time-synchronization of the wireless connection 502.

Figure 3:
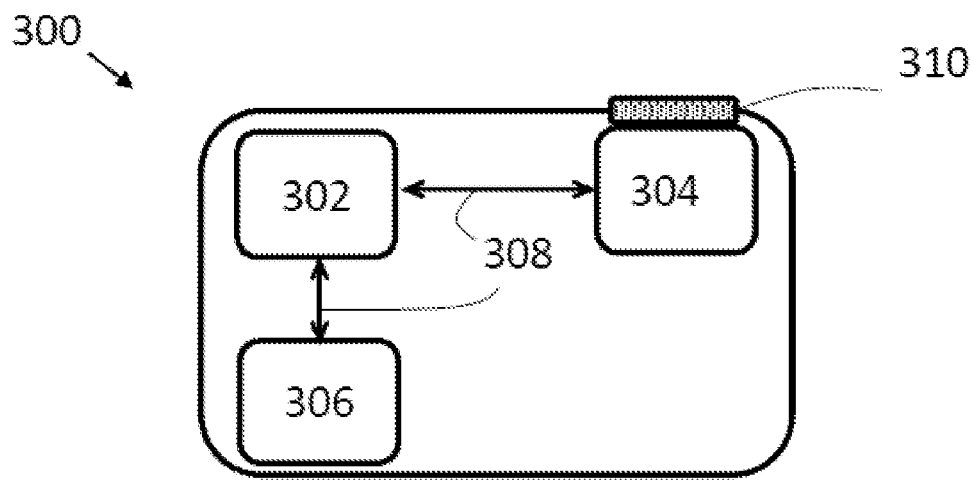
FIG. 3 shows a client device according to an embodiment of the application.

FIG. 3 shows a client device 300 according to an embodiment of the application. In the embodiment shown in FIG. 3, the client device 300 comprises a processor 302, a transceiver 304 and a memory 306. The processor 302 is coupled to the transceiver 304 and the memory 306 by communication means 308 known in the art. The client device 300 further comprises an antenna or antenna array 310 coupled to the transceiver 304, which means that the client device 300 is configured for wireless communications in a wireless communication system.

That the client device 300 is configured to perform certain actions can in this disclosure be understood to mean that the client device 300 comprises suitable means, such as e.g. the processor 302 and the transceiver 304, configured to perform said actions.

According to embodiments of the application the client device 300 is configured to setup a wireless connection 502 with a network access node 100. The client device 300 is further configured to receive a control message 510 from the network access node 100. The control message 510 instructs the client device 300 to transmit a response signal 520 to the network access node 100 for maintaining a time-synchronization of the wireless connection 502. The client device 300 is further configured to transmit the response signal 520 to the network access node 100 upon reception of the control message 510.

Figure 4:
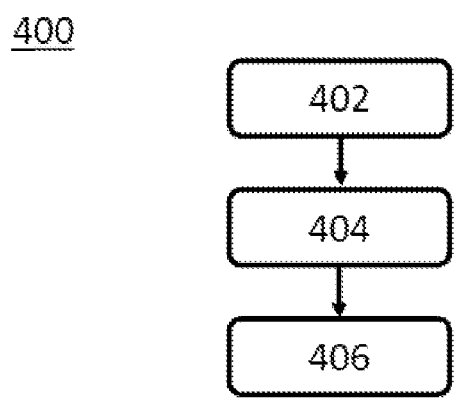
FIG. 4 shows a method according to an embodiment of the application.

FIG. 4 shows a flow chart of a corresponding method 400 which may be executed in a client device 300, such as the one shown in FIG. 3. The method 400 comprises setting up 402 a wireless connection 502 with a network access node 100. The method 400 further comprises receiving 404 a control message 510 from the network access node 100. The control message 510 instructs the client device 300 to transmit a response signal 520 to the network access node 100 for maintaining a time-synchronization of the wireless connection 502. The method 400 further comprises transmitting 406 the response signal 520 to the network access node 100 upon reception of the control message 510.

FIG. 5 shows a wireless communication system 500 according to an embodiment of the application. The wireless communication system 500 comprises a client device 300 and a network access node 100 configured to operate in the wireless communication system 500. For simplicity, the wireless communication system 500 shown in FIG. 5 only comprises one client device 300 and one network access node 100. However, the wireless communication system 500 may comprise any number of client devices 300 and network access nodes 100 without deviating from the scope of the application.

In the embodiment shown in FIG. 5, a wireless connection 502 is setup between the client device 300 and the network access node 100. The wireless connection 502 can be set up according to procedures defined in communication standards, such as 3GPP, and enables data transmission (Downlink) from the network access node 100 to the client device 300. However, the wireless connection 502 can also be configured for data transmission (Uplink) from the client device 300 to the network access node 100. The wireless connection 502 is assumed to be configured for a service which has strict latency and/or reliability constraints, e.g. a URLLC service. Hence, it becomes important for the client device 300 to maintain the time-synchronization for the wireless connection 502 to the network access node 100. The network access node 100 may monitor the time-synchronization status of the wireless connection 502 based on e.g. a network side time alignment timer configured for the client device 300. When the time alignment timer, which can be started upon a timing advance command, expires the wireless connection 502 is no longer considered to be time-synchronized. According to embodiments of the application the network access node 100 therefore transmits a control message 510 prior to expiry of the time alignment timer. The control message 510 instructs the client device 300 to transmit a response signal 520 to the network access node 100 upon reception of the control message 510. The response signal 520 allows the network access node 100 to determine the timing advance for the wireless connection 502 and perform necessary timing adjustments, e.g. transmit a new timing advance command to the client device 300. Thereby, time-synchronization of the wireless connection 502 can be maintained.

Figure 6:
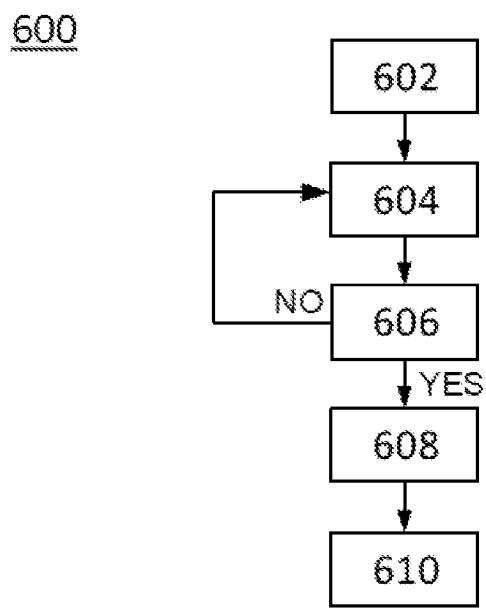
FIG. 6 shows a flow chart of a method according to an embodiment of the application.

FIG. 6 shows a flow chart of a method 600 for maintaining time-synchronization of a wireless connection 502 according to an embodiment of the application. The method 600 may be performed in a network access node, such as e.g. the network access node 100 shown in FIG. 1. In step 602, a wireless connection 502 is set up between the network access node 100 and a client device 300. The wireless connection 502 may be configured for services with a latency constraint and/or a reliability constraint as previously described. The latency constraint and/or the reliability constraint may be associated with at least one of: a quality of service flow identity, a network slice selection assistance information configuration, a radio resource control (RRC) parameter, and a medium access control (MAC) parameter. These parameters may be configured by the network access node 100. For example, the quality of service flow identity and network slice selection assistance information configuration may be higher layer signaling (non-access stratum) indicating the current service and service requirements configured for the client device 300. Each such service configuration has certain reliability and latency requirements, and a processing unit in the client device 300 may determine from the service configurations whether the client device 300 is configured for low latency and/or high reliability services. In some embodiments, the service configurations mentioned above is mirrored down to the RRC or MAC layer, and corresponds to a RRC or a MAC configuration. In this case, a processing unit in the client device 300 may determine from the RRC or MAC configuration (RRC or MAC parameters) whether the client device 300 is configured for low latency and/or high reliability services.

The service may be a service with strict latency constraint and/or reliability constraint, such as e.g. an URLLC service requiring residual block error rate (BLER) of 10e-5 and latency of 1 ms. The latency constraint of the service may be determined e.g. based on a delay threshold for the service, where the delay may correspond to an end-to-end delay or a radio access network delay such as packet delay budget. Furthermore, the reliability constraint may be determined e.g. based on an error rate threshold for the service, where the error rate may correspond to a packet error rate or a block error rate. The corresponding thresholds described above may be explicitly configured by the network access node 100 or implicitly determined by client device 300 from a certain service configuration, such as the ones described above.

In step 604, the network access node 100 monitors time-synchronization events for the wireless connection 502. According to the embodiments of the application a time-synchronization event for the wireless connection 502 may be associated with a time-synchronization status timer, such as e.g. a time alignment timer configured for the client device 300 by the network access node 100. This time alignment timer in the network access node 100 may be a replica of a conventional time alignment timer running in the client device 300. An event may be based on an expiry or a remaining time of a running time alignment timer. Thus, in embodiments a time-synchronization event may be triggered based on an expiry of a time alignment timer configured for the client device 300. However, a time-synchronization event may in embodiments instead be triggered prior to the expiry of the time alignment timer with a time threshold value. In other words, when the remaining time until the time alignment timer expires equals the time threshold value, a time-synchronization event may be triggered. The latter embodiment means that the network access node 100 is given more time to act to maintain the time-synchronization for the wireless connection. The network access node 100 may e.g. have time to transmit a timing advance command to the client device 300, when the system capacity and cell load so permits. Hence, mentioned time threshold value can be tuned such that the network access node 100 can have some flexibility in the transmission of the control message 510 and adapt the transmission to current cell load etc.

Based on the monitoring in step 604, the network access node 100 determines in step 606 if a time-synchronization event for the wireless connection 502 has been triggered. If a time-synchronization event for the wireless connection 502 has been triggered, i.e. the outcome of the determination in step 606 is YES, the network access node 100 transmits a control message 510 to the client device 300 in step 608. On the other hand, if a time-synchronization event for the wireless connection 502 has not been triggered in step 606, i.e. the outcome of the determination in step 606 is NO, the network access node 100 continuous to monitor for time-synchronization events for the wireless connection 502 in step 604.

The control message 510 transmitted in step 608 instructs the client device 300 to transmit a response signal 520 to the network access node 100 upon reception of the control message 510. In embodiments, the control message 510 may be any of downlink control information (DCI) instructing transmission of a random access preamble, DCI instructing transmission of a sounding reference signal (SRS), DCI instructing transmission of a response signal 520 for maintaining time-synchronization of the wireless connection 502, and a medium access control (MAC) control element (CE) instructing transmission of a response signal 520 for maintaining time-synchronization of the wireless connection 502.

Based on the type of control message 510 used, the response signal 520 may be a signal associated with a physical uplink shared channel (PUSCH), a signal associated with a physical uplink control channel (PUCCH), a signal associated with a physical random access channel (PRACH), and a SRS. The signal associated with the PUSCH or the PUCCH may e.g. be uplink control information (UCI) comprising a scheduling request (SR) or channel status information (CSI). The CSI may in turn be an aperiodic-CSI or low latency-CSI and e.g. comprise a channel quality indicator (CQI) report. The signal associated with the PUSCH may further e.g. be a layer 3 measurement report. The signal associated with the PUCCH may further e.g. be a scheduling request (SR). The type of response signal 520 transmitted by the client device 300, as well as other information related to the response signal 520, may e.g. be pre-defined by a standard, signalled by the network access node 100, or a combination of pre-defined and signalled. For example, the type of response signal 520 may be pre-defined in a standard but the resources to use for the signalling may be signalled from network access node 100. In case the network access node 100 signals information specifying the type of response signal 520 to be used by the client device 300 and/or other information related to the response signal 520, this information may e.g. be comprised in the control message 510.

The control message 510 transmitted in step 608 may comprise additional information associated with the response signal 520. For example, the control message 510 may further indicate time-frequency resources associated with the response signal 520 for maintaining a time-synchronization of the wireless connection 502. The time-frequency resources associated with the response signal 520 can be directly/explicitly indicated in the control message 510. However, the time-frequency resources associated with the response signal 520 may further be implicitly indicated in the control message 510, e.g. based on a semi-static configuration. The client device 300 will then use these time-frequency resources for transmission of the response signal 520 to the network access node 100.

The network access node 100 may transmit the control message 510 to the client device 300 directly when the time-synchronization event for the wireless connection 502 is triggered in step 606. However, the network access node 100 may in embodiments instead transmit the control message 510 to the client device 300 a time period after the time-synchronization event has been triggered. In this case, the time period may be determined based on at least one of a cell load and an available capacity of the network access node 100. The time period may e.g. be short when the cell load is low and/or the available capacity is high, or vice versa. The network access node 100 may hence control when to transmit the control message 510 based on cell load and/or available capacity. The network access node 100 may e.g. wait and transmit the control message 510 when the cell load is low. Since the time-synchronization may not be time critical down to ms level, the network access node 100 may e.g. down prioritize the control message transmission for e.g. 10-100 ms based on other transmissions waiting to be transmitted. The network access node 100 may e.g. down prioritize the control message transmission, if the network access node 100 has low latency downlink information to transmit to another client device.

In response to the control message 510 transmitted by the network access node 100 in step 608, the network access node 100 may receive the response signal 520 from the client device 300. Based on the received response signal 520 from the client device 300, the network access node 100 may perform timing advance control in step 610 for the wireless connection 502. Further details related to the transmission of the response signal 520 by the client device 300 and the timing advance control performed by the network access node 100 based on the received response signal 520 will now be described with reference to FIG. 7.

FIG. 7 shows signalling for maintaining a time-synchronization of a wireless connection 502 between a network access node 100 and a client device 300 according to an embodiment. In the embodiment shown in FIG. 7, a wireless connection 502 has been set up between the network access node 100 and the client device 300 based on conventional methods. The wireless connection 502 may be configured for services with a latency constraint. The latency constraint may be associated with at least one of: a quality of service flow identity, a network slice selection assistance information configuration, a radio resource control parameter, and a medium access control parameter.

In step I in FIG. 7, a time-synchronization event for the wireless connection 502 is triggered. As described above with reference to FIG. 6, a time-synchronization event may e.g. be triggered prior to the expiry of a time alignment timer or based on an expiry of a time alignment timer. When the time-synchronization event for the wireless connection 502 is triggered in step I in FIG. 7, the network access node 100 transmits a control message 510 to the client device 300, as shown in step II in FIG. 7. The control message 510 instructs the client device 300 to transmit a response signal 520 to the network access node 100 for maintaining a time-synchronization of the wireless connection 502. The client device 300 receives the control message 510 from the network access node 100 and transmits the response signal 520 to the network access node 100 upon reception of the control message 510, as shown in step III in FIG. 7

As described above with reference to FIG. 6, the control message 510 may be any of DCI instructing transmission of a random access preamble, DCI instructing transmission of a sounding reference signal, DCI instructing transmission of a response signal for maintaining time-synchronization of the wireless connection 502, and MAC CE instructing transmission of a response signal for maintaining time-synchronization of the wireless connection 502. Furthermore, the response signal 520 may be any of a signal associated with a PUSCH, a signal associated with a PUCCH, a signal associated with a PRACH, and a SRS.

The control message 510 transmitted in step II in FIG. 7 may further indicate time-frequency resources associated with the response signal 520. In this case, the client device 300 may transmit the response signal 520 in step III in FIG. 7 in the indicated time-frequency resources. The client device 300 may further transmit the response signal 520 with the current timing advance, i.e. with the latest timing advance value received from the network access node 100.

When the network access node 100 receives the response signal 520 from the client device 300, the network access node 100 determines in step IV in FIG. 7 a timing advance based on the received response signal 520 and a timing advance value 530 based on the determined timing advance. In step V in FIG. 7, the network access node 100 transmits the determined timing advance value 530 to the client device 300. The timing advance and the timing advance value 530 may be determined based on methods in the art. Furthermore, the timing advance value 530 may e.g. be transmitted in a timing advance command known in the art. In addition upon transmission of the timing advance command the network access node resets and restarts the network side time alignment timer associated with the wireless connection 502.

The client device 300 receives the timing advance value 530 from the network access node 100. The timing advance value 530 is received in response to the transmission of the response signal 520 to the network access node 100. Based on the received timing advance value 530, the client device 300 time adjust its uplink transmissions to the network access node 100. Furthermore, also the client device 300 may have a client device side timing alignment timer associated with the wireless connection 502. This client device side timing alignment timer can be configured by the network access node and the network side time alignment timer may be a replica of the configured time alignment timer. Upon reception of the received timing advance value 530, the client device 300 may also reset and restart this client device side timing alignment timer. It should be understood, that as the network access node 100 already has a time alignment timer associated with the wireless connection running, it is not absolutely necessary that the client device 300 has a time alignment timer for this wireless connection 502. Nevertheless the client device 300 may have further time alignment timer(s) associated with other wireless connections e.g. not having a latency constraint and not being observed by the network access node 100. The next time the client device 300 has an uplink transmission on the wireless connection 502 to the network access node 100, the uplink transmission will be transmitted based on the timing advance value 530 (not shown in FIG. 7) which means that the uplink time-synchronization is adapted to the timing advance value 530.

The client device 300 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access nodes 100 herein may also be denoted as a radio client device, an access client device, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio client devices may be of different classes such as e.g. macro eNodeB, home eNodeB or pico base station, based on transmission power and thereby also cell size. The radio client device can be a Station (STA), which is any device that contains an IEEE 802.11-conformant Media Access Control (MAC) and Physical Layer (PHY) interface to the Wireless Medium (WM). The radio client device may also be a base station corresponding to the fifth generation (5G) wireless systems.

Furthermore, any method according to embodiments of the application may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 300 and the network access node 100 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 300 and the network access node 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the application is not limited to the embodiments described above, but also relates to and incorporates all embodiments within the scope of the appended independent claims.

The invention claimed is:

1. An apparatus, comprising:
at least one processor; and
a memory coupled to the at least one processor, wherein the memory stores a program to be executed by the at least one processor, the program including instructions for:
setting up a wireless connection with a network access node;
receiving a control message from the network access node, wherein the control message indicates the apparatus to transmit a response signal to the network access node for maintaining a time-synchronization of the wireless connection; and
transmitting the response signal to the network access node upon reception of the control message.

2. The apparatus according to claim 1, wherein the control message is one of:
downlink control information indicating transmission of a random access preamble,
downlink control information indicating transmission of a sounding reference signal,
downlink control information indicating transmission of a response signal for maintaining time-synchronization of the wireless connection, or
medium access control (MAC) control element (CE) indicating transmission of a response signal for maintaining time-synchronization of the wireless connection.

3. The apparatus according to claim 1, wherein the control message indicates the apparatus to transmit the response signal as one of:
a signal associated with a physical uplink shared channel,
a signal associated with a physical uplink control channel,
a signal associated with a physical random access channel, or
a sounding reference signal.

4. The apparatus according to claim 1, wherein the control message indicates time-frequency resources associated with the response signal, and wherein the transmitting the response signal comprises:
transmitting the response signal in the indicated time-frequency resources.

5. The apparatus according to claim 1, wherein the program further includes instructions for:
receiving a timing advance value from the network access node in response to the transmission of the response signal to the network access node; and
time adjusting transmissions to the network access node based on the received timing advance value.

6. The apparatus according to claim 1, wherein the wireless connection is configured for services with a latency constraint.

7. The apparatus according to claim 6, wherein the latency constraint is associated with at least one of:
a quality of service flow identity,
a network slice selection assistance information configuration,
a radio resource control parameter, or
a medium access control parameter.

8. A method, comprising:
setting up a wireless connection with a network access node;
receiving a control message from the network access node, wherein the control message indicates to transmit a response signal to the network access node for maintaining a time-synchronization of the wireless connection; and
transmitting the response signal to the network access node upon reception of the control message.

9. The method according to claim 8, wherein the control message is one of:
downlink control information indicating transmission of a random access preamble,
downlink control information indicating transmission of a sounding reference signal,
downlink control information indicating transmission of a response signal for maintaining time-synchronization of the wireless connection, or
medium access control (MAC) control element (CE) indicating transmission of a response signal for maintaining time-synchronization of the wireless connection.

10. The method according to claim 8, wherein the control message indicates to transmit the response signal as one of:
a signal associated with a physical uplink shared channel,
a signal associated with a physical uplink control channel,
a signal associated with a physical random access channel, or
a sounding reference signal.

11. The method according to claim 8, wherein the control message indicates time-frequency resources associated with the response signal, and wherein the transmitting the response signal comprises:
transmitting the response signal in the indicated time-frequency resources.

12. The method according to claim 8, further comprising:
receiving a timing advance value from the network access node in response to the transmission of the response signal to the network access node; and
time adjusting transmissions to the network access node based on the received timing advance value.

13. The method according to claim 8, wherein the wireless connection is configured for services with a latency constraint.

14. The method according to claim 13, wherein the latency constraint is associated with at least one of:
a quality of service flow identity,
a network slice selection assistance information configuration,
a radio resource control parameter, or
a medium access control parameter.

15. A non-transitory computer readable medium, wherein the non-transitory computer readable medium stores instructions that are executable by a computer, and the instructions comprise instructions for:
setting up a wireless connection with a network access node;
receiving a control message from the network access node, wherein the control message indicates to transmit a response signal to the network access node for maintaining a time-synchronization of the wireless connection; and
transmitting the response signal to the network access node upon reception of the control message.

16. The non-transitory computer readable medium according to claim 15, wherein the control message is one of:
downlink control information indicating transmission of a random access preamble,
downlink control information indicating transmission of a sounding reference signal,
downlink control information indicating transmission of a response signal for maintaining time-synchronization of the wireless connection, or
medium access control (MAC) control element (CE) indicating transmission of a response signal for maintaining time-synchronization of the wireless connection.

17. The non-transitory computer readable medium according to claim 15, wherein the control message indicates to transmit the response signal as one of:
a signal associated with a physical uplink shared channel,
a signal associated with a physical uplink control channel,
a signal associated with a physical random access channel, or
a sounding reference signal.

18. The non-transitory computer readable medium according to claim 15, wherein the control message indicates time-frequency resources associated with the response signal, and wherein the transmitting the response signal comprises:
transmitting the response signal in the indicated time-frequency resources.

19. The non-transitory computer readable medium according to claim 15, wherein the instructions further comprise instructions for:
receiving a timing advance value from the network access node in response to the transmission of the response signal to the network access node; and
time adjusting transmissions to the network access node based on the received timing advance value.

20. The non-transitory computer readable medium according to claim 15, wherein the wireless connection is configured for services with a latency constraint.

* * * * *